US010764635B2

(12) United States Patent
Durham et al.

(10) Patent No.: US 10,764,635 B2
(45) Date of Patent: *Sep. 1, 2020

(54) AGGREGATED STRESS MONITORING TO GUIDE USER INTERACTION

(71) Applicant: Intel Corporation, Santa Clara, CA (US)

(72) Inventors: Lenitra M. Durham, Beaverton, OR (US); Tamir Damian Munafo, Naale (IL); Rita H. Wouhaybi, Portland, OR (US); Adi Shaliv, Nir-Banim (IL); Giuseppe Raffa, Portland, OR (US); Oleg Pogorelik, Lapid (IL); Sangita Ravi Sharma, Portland, OR (US); Alex Nayshtut, Gan Yavne D (IL)

(73) Assignee: Intel Corporation, Santa Clara, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/222,622

(22) Filed: Dec. 17, 2018

(65) Prior Publication Data

US 2019/0230411 A1    Jul. 25, 2019

Related U.S. Application Data

(63) Continuation of application No. 15/474,599, filed on Mar. 30, 2017, now Pat. No. 10,158,914.

(51) Int. Cl.
*H04N 21/442* (2011.01)
*H04N 21/258* (2011.01)
(Continued)

(52) U.S. Cl.
CPC ... *H04N 21/44218* (2013.01); *G06K 9/00335* (2013.01); *G06K 9/00597* (2013.01);
(Continued)

(58) Field of Classification Search
None
See application file for complete search history.

(56) References Cited

U.S. PATENT DOCUMENTS 10,158,914 B2 * 12/2018 Durham ............ H04N 21/44218
2006/0130121 A1 * 6/2006 Candelore ............ G11B 27/034
725/145

(Continued)

OTHER PUBLICATIONS

"U.S. Appl. No. 15/474,599, Non Final Office Action dated Feb. 14, 2018", 19 pgs.

(Continued)

*Primary Examiner* — Mulugeta Mengesha
*Assistant Examiner* — Charles N Hicks
(74) *Attorney, Agent, or Firm* — Schwegman Lundberg & Woessner, P.A.

(57) ABSTRACT

A system and method for real-time alteration of media content based on stress monitoring is disclosed. A computer system present a single media content item in two distinct content streams to a first and second user. Using sensor generated data the computer system measures at least one user response indicator for the first and second user and estimates a stress level for the first and second users. The computer system determines whether the estimated stress level for the first user exceeds a first predetermined stress threshold. In accordance with a determination that the estimated stress level for the first user exceeds a first predetermined stress threshold the computer system alters the first stream of the presented media content item to modify the particular portion of the media content item associated with the estimated stress level for the first user.

20 Claims, 10 Drawing Sheets

(51) Int. Cl.
  *H04N 21/45* (2011.01)
  *G06K 9/00* (2006.01)
  *H04N 21/2343* (2011.01)
  *H04N 21/454* (2011.01)
  *H04N 21/4223* (2011.01)
  *H04N 21/234* (2011.01)
  *H04N 21/4545* (2011.01)

(52) U.S. Cl.
  CPC . *H04N 21/23424* (2013.01); *H04N 21/23439* (2013.01); *H04N 21/25883* (2013.01); *H04N 21/4223* (2013.01); *H04N 21/4532* (2013.01); *H04N 21/4542* (2013.01); *H04N 21/45455* (2013.01)

(56) References Cited

U.S. PATENT DOCUMENTS

| | | |
|---|---|---|
| 2014/0282656 A1 | 9/2014 | Belyaev et al. |
| 2015/0128046 A1 | 5/2015 | Cormican et al. |
| 2017/0025152 A1 | 1/2017 | Jaime et al. |
| 2017/0223413 A1 | 8/2017 | Kozloski et al. |
| 2018/0288478 A1 | 10/2018 | Durham et al. |

OTHER PUBLICATIONS

"U.S. Appl. No. 15/474,599, Notice of Allowance dated Aug. 10, 2018", 5 pgs.

"U.S. Appl. No. 15/474,599, Response filed Apr. 27, 2018 to Non Final Office Action dated Feb. 14, 2018", 10 pgs.

Eliashberg, Jehoshua, et al., "Modeling Goesto Hollywood: Predicting Individual Differences in Movie Enjoyment", Management Science vol. 40 No. 9, (Sep. 1994), 1151-1173.

Soleymani, Mohammad, et al.,"Affective Characterization of Movie Scenes Based on Content Analysis and Physiological Changes", International Journal of Semantic Computing vol. 3, No. 2, (2009), 20 pgs.

* cited by examiner

AGGREGATED STRESS MONITORING TO GUIDE USER INTERACTION

PRIORITY APPLICATION

This application is a continuation of U.S. application Ser. No. 15/474,599, filed Mar. 30, 2017, now issued as U.S. Pat. No. 10,158,914, which is incorporated herein by reference in its entirety.

TECHNICAL FIELD

Embodiments described herein generally relate to measuring and reacting to user stress.

BACKGROUND

Electronic devices are increasingly integrated into daily life. One example is how electronic devices have enabled a variety of new options for accessing, viewing, and responding to media content such as movies, music, television, and the like. Computers allow for an increasing number of options for customizing what content to accesses and how users are able to access it.

With such a large amount of content available to access, users may choose what media to consume and when to consume it. However, some content items may contain content that is stressful for the user. Currently, if a content item has content that is too stressful for a user, even a small amount, the user may only avoid the media content item altogether.

Additionally, different users have different tolerances for stressful content. Thus, if a group of users is viewing a content item that has sections that go beyond acceptable stress levels for one user but not for other users. Thus, the group either views the content that is objectionable to one user or does not view the content item at all.

DESCRIPTION OF EMBODIMENTS

Figure 1:
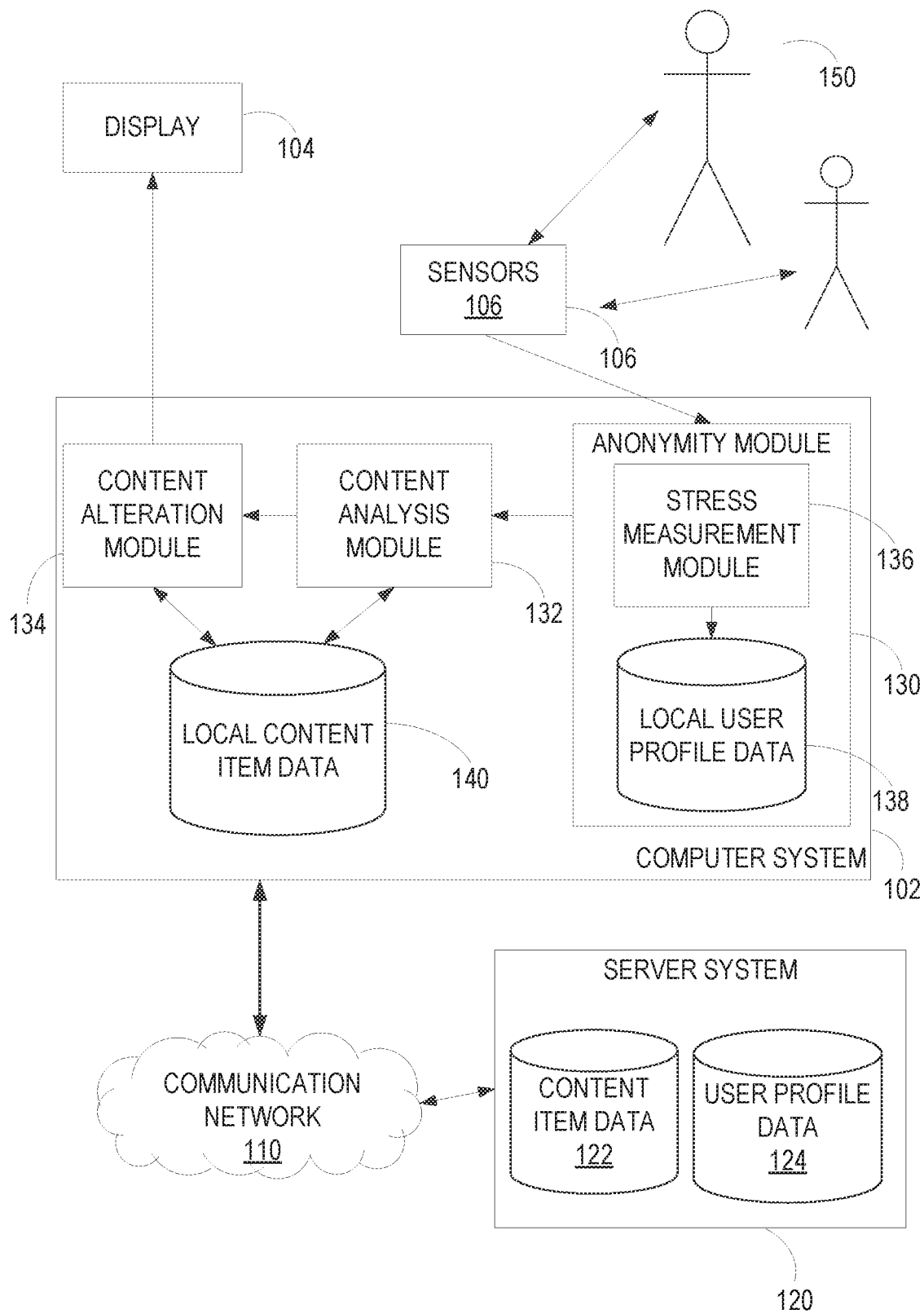
FIG. 1 is a block diagram depicting a computer system, in accordance with some example embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Electronic devices may be used to present media content items (e.g., movies, shows, music, electronic arts, interactive media, and so on) to users. However, a user may inadvertently begin viewing media with content that is too disturbing or stressful for them (e.g., based the age of a user or the content having disturbing material or content related to a topic to which a user is sensitive). This is especially true when a group of users (e.g., a family) with different tolerances for stressful content want to view a media content item. In some example embodiments, a computer system may use sensors to record data that indicates the current stress level of a plurality of users each viewing the same content item.

In some example embodiments, the computer system may record data associated with, but not limited to, a user's heart rate, the posture or physical motion of a user, an audio response that a user makes (e.g., screams), blood pressure level, the presence of perspiration, and so on. In some example embodiments, this data is recorded by a camera, a microphone, a wearable computer device (e.g., a smartwatch or fitness tracker) and transmitted to the computer system.

Once this data has been recorded it is compared to threshold values or reference values to determine a stress level for the user. For example, a heart rate or perspiration level may be matched with a particular stress level based on information about the particular user (e.g., the age for the user). In addition, user physical action, such as covering their eyes, looking away from the screen, or leaving the room, may be associated with stress levels as well.

In some example embodiments, the level of stress is a value between 0 and 1. In some example embodiments, a threshold stress level is predetermined for each user based on demographic information for the user, the specific preferences of the user (e.g., received from the user), or information about past behavior (with the users permission).

In some example embodiments, the computer system determines whether the detected stress level exceeds the stress level threshold. In accordance with a determination that the detected stress level for a first user exceeds the threshold value, the computer system then alters the present media content item in response.

In some example embodiments, the computer system associates stress data with a particular portion of the media content item (e.g., based on the time that the stress data was recorded or the area of a screen that the user was paying attention to). For example, any particular stress data is associated with a particular scene (e.g., of a movie) or item on screen (e.g., if the user is looking at a particular character). Thus, when the computer system determines that the user stress level is above a given stress level, the particular portion of the media content item may be removed or edited. For example, a director of a movie may film two versions of a scene, a first version with the potentially stressful content intact and a second version with less potentially stressful content.

When a user exceeds a predetermined stress level while viewing that scene, the second, less stressful scene may be substituted in real time. In other example embodiments, other content (such as supplementary content or an alternative scene) is displayed. In some example embodiments, a user is notified (e.g., by a visual indication, text message, or other messaging method) that alternate content has been presented.

In some example embodiments, a group of users are watching a media content item at the same time. In some example embodiments, the users are all watching the media content item on personal electronic displays. In this case, each user may have their own stress level threshold and the content in the content item may be customized for them. However, to prevent misunderstanding and spoilers, if a user has an alteration of content, the other users may be notified of the changes for later discussion. This is especially true if parents and children are watching a content item and the children have a content altered, the parent may be notified (e.g., via a message or visual notification) of which changes have been made.

FIG. 1 is a block diagram depicting a computer system 102, in accordance with some example embodiments. The computer system 102 includes an anonymity module 130, a stress measurement module 136, a content analysis module 132, and a content alteration module 134. The computer system 102 also is connected to one or more server systems 120. One or more communication networks 110 interconnect these components. The communication network 110 may be any of a variety of network types, including local area networks (LANs), wide area networks (WANs), wireless networks, wired networks, the Internet, personal area networks (PANS), or a combination of such networks. In some example embodiments, the computer system 102 has an associated one or more content presentation devices 104 and one or more associated sensors 106.

As is understood by skilled artisans in the relevant computer and Internet-related arts, each module or engine shown in FIG. 1 represents a set of executable software instructions and the corresponding hardware (e.g., memory and processing circuitry) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a computer system 102, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although depicted in FIG. 1 as a three-component type of architecture, the various example embodiments are by no means limited to this architecture.

As shown by way of example in FIG. 1, the computer system 102 includes a network interface module(s) (e.g., a web server) (not shown), which receives data and/or requests from a server system 120, and communicates data back to the server system 120 when appropriate. In some example embodiments, the computer system 102 also includes one or more content presentation devices 104. A variety of technologies may be used to present media content items. In some example embodiments, the content presentation device 104 is one of a display, speaker, or other types of device capable of presenting information to a user.

In some example embodiments, the computer system 102 is associated with one or more sensors 106. In some example embodiments, the one or more sensors 106 may include a camera or other device for capturing visual data, a microphone or other device for capturing audio data, a heart rate monitor in a wearable computer device (e.g., a smartphone or fitness tracker), wearable headbands, shirts or other apparel with integrated computing technology, a wearable clip or belt attachment, a shoe worn or food based wearable computing device, or any other type of wearable computing device.

As shown by way of example in FIG. 1, the data components include local member profile data 138 (e.g., demographic information about the user and past user reaction data) and a local content item data 140 (e.g., stores information about presented media content items including information about what content is displayed at a given point, what objects are displayed at given parts of the screen at given times, and so on). It should be noted that in this application, "data" or "database" is used to refer to any method or type of data storage or retention and is not limited to formal databases. Thus, any data structure or format may be used to hold the data in local member profile data 138 and the local content item data 140.

The anonymity module 130 allows information about one or more users (150) to be recorded and analyzed (with the user's 150 permission) and analyzed without any personally identifiable information to be exposed to a server system 120 or other components of the computer system 102. Thus, the anonymity module 130 removes personally identifiable information from any data retrieved from the one or more sensors 106 or stored in the local member profile data 138. Thus, this data may then be used by the server system 120 for generating generalized data about users' 150 reactions to specific media content items without compromising a user's 150 privacy. Other example embodiments may be made without an anonymity module 130.

In some example embodiments, the anonymity module 130 includes a stress measurement module 136. The stress measurement module 136 receives user reaction data from one or more sensors 106. In some example embodiments, the data received from the one or more sensors 106 is a discrete value such as a heart rate number or a volume level (e.g., a stressed user 150 may be louder than a non-stressed user 150). In other example embodiments, the data may need to be analyzed or converted in a useful form. For example, a camera may capture data representing the movement of a user 150. The stress measurement module 136 uses received sensor data to identify desecrate actions by the user or user(s) 150. Once discrete actions are identified, each action is score to determine the degree to which it represents user stress. For example a user 150 hiding their eyes would indicate more stress than a user 150 in a relaxed pose watching the screen.

In some example embodiments, the stress measurement module 136 accesses local member profile data 138 to evaluate data received from the one or more sensors 106. In this way, a user's 150 past reactions may be used to evaluate the current reaction data generated by the one or more sensors 106. For example, if a user 150 has often left the room during presentation of a media content item without being stressed, the stress measurement module 136 will not determine the user 150 leaving the room to be a high indicator of stress.

In some example embodiments, the stress measurement module 136 determines a stress level for a user 150 at a given time. If the stress level exceeds a predetermined stress threshold, the stress measurement module 136 transmits the stress level and information about when and how the elevated stress level occurred to the content analysis module 132.

In some example embodiments, the content analysis module 132 uses stress level data received from the stress measurement module 136 and associates that stress level with a particular portion of the presented media content item. For example, the content analysis module 132 receives a notification that a user 150 is experiencing stress beyond the threshold level along with a time stamp representing at which point the stress levels began or exceeded the threshold level. The content analysis module 132 uses information in the local content item data 140 to determine the scene (or scenes) that are associated with the high user stress level.

In other example embodiments, the stress measurement module 136 also identifies a portion of the content presentation device 104 that the user 150 was viewing when their stress level exceeded the threshold. The content analysis module 132 uses the time stamp and identified portion of the screen to search the local content item data 140 to identify the object that the user 150 was viewing when their stress level rose. In some example embodiments, the object is a character, an item, an action, or other displayed item or event.

In some example embodiments, the one or more sensors 106 include one or more camera devices. The camera devices capture visual information about the position and angle of a user's two eyes. For each eye, the computer system calculates an eye line from the eye to the point at which the eye line intersects with the content presentation device 104 (e.g., a display). If the two eye lines intersect with a display within a certain distance, the computer system 102 determines that the user is focusing on that portion of the display. If the eye line interest points are too far away, the computer system 102 determines that the user is focusing on a point behind the display or, if the eye line intersect points have crossed such that the eye line intersect for the right eye is to the left of the eye line intersect point for the left eye, the computer system 102 determines that the user is focused on a point in front of the content presentation device 104.

In some example embodiments, the content analysis module 132 transmits information identifying the scene or object within a scene associated with the high stress level to the content alteration module 134. In some example embodiments, the content alteration module 134 alters the local content item data 140 to remove or alter the scene or object that is associated with the stress. For example, the content alteration module 134 may remove a stressful scene by replacing it with a less stressful alternative. This alternative may be a specifically designated replacement scene provided by the author of the content item as a less stressful alternative. In other example embodiments, the content alteration module 134 identifies supplementary material such as "making of" footage or outtakes that may be substituted. In other example embodiments, the scene is ended prematurely without any replacement.

In other example embodiments, the content analysis module 132 identifies a particle object (e.g., a character or item) that is disturbing and the content alteration module 134 blurs or obscures that object going forward using information in the local content item data 140.

In some example embodiments, the content analysis module 132 uses information about past user stress levels to identify potentially stressful scenes or objects before they are presented to the user 150. The content analysis module 132 may then direct the content alteration module 134 to remove or alter the potentially stressful content.

In some example embodiments, the computer system 102 uses a communication network 110 to connect to a server system 120. In some example embodiments, the server system 120 is associated with a system for providing real-time content filtering. For example, information about the contents of a particular media content item may be requested from the server system 120 when the media content item begins. The received information may be stored as local content item data 140. This information may include data describing the content displayed at each frame of media content and might also highlight potentially disturbing content.

In some example embodiments, the computer system 102 may also access user profile 124 at the server system 120. This user profile data may be generalized data for particular age groups/cultures or, if a user 150 at the computer system 102 allows, their personal profile may be accessed and stored in the local member profile data 138.

Figure 2:
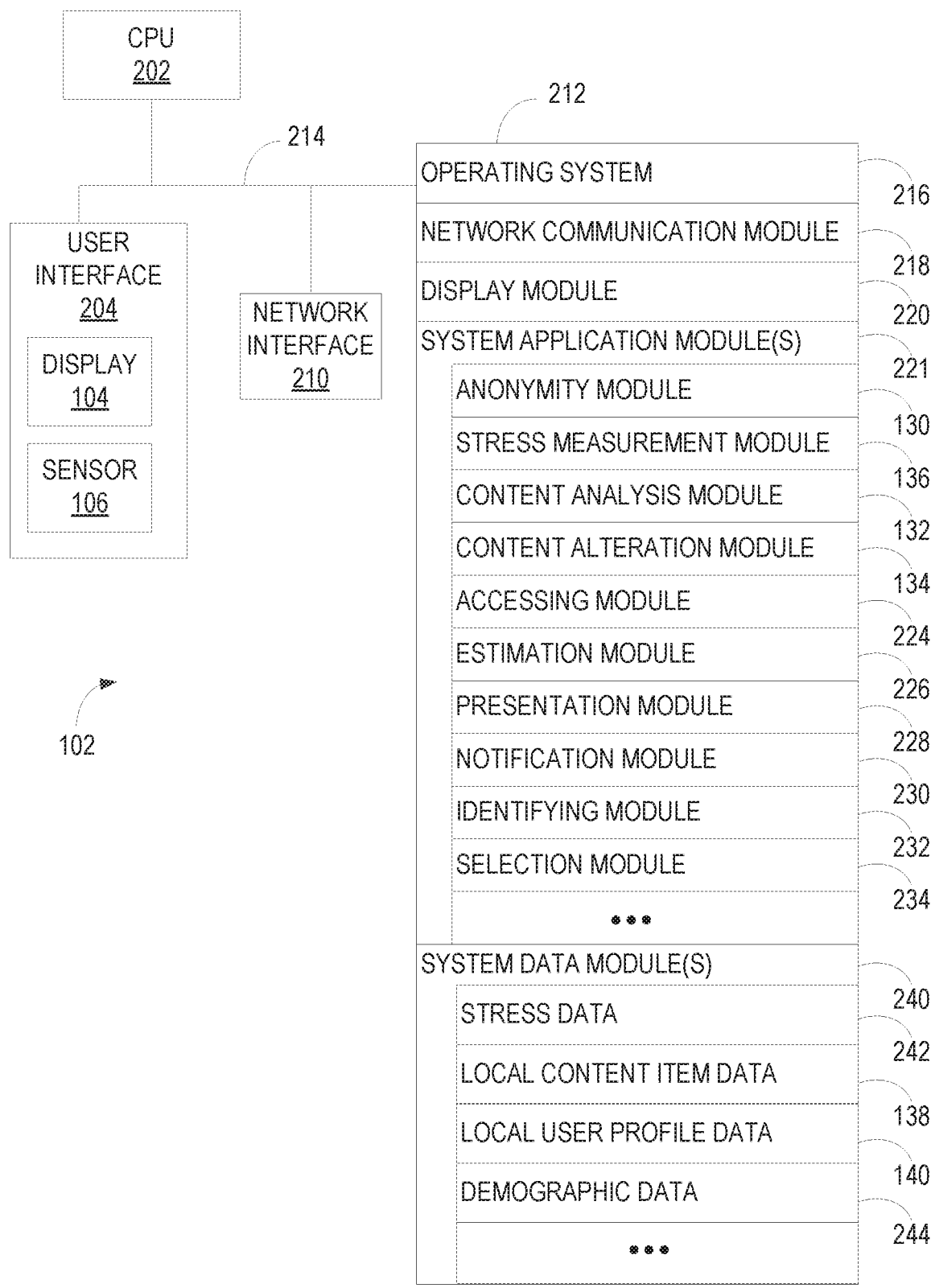
FIG. 2 is a block diagram further illustrating a computer system, in accordance with some example embodiments.

FIG. 2 is a block diagram further illustrating the computer system 102, in accordance with some example embodiments. The computer system 102 typically includes one or more processing units (CPUs) 202, one or more network interfaces 210, memory 212, and one or more communication buses 214 for interconnecting these components.

In some example embodiments, the computer system 102 includes user interface 204 components for presenting content to a user 150 such as a one or more content presentation devices 104 and components for receiving input from users 150, such as one or more sensors 106. In some example embodiments, the one or more sensors 106 include any of a camera, a microphone, a heart rate monitor, a galvanic skin response measurement sensor, an accelerometer, and a gyroscope. In some example embodiments, the one or more sensors 106 are included in a wearable device worn by the user 150 that is connected wirelessly to the computer system 102.

In some example embodiments, the user interface 204 includes other input means such as a keyboard, a mouse, a touch sensitive display, or other input buttons.

Memory 212 includes high-speed random access memory, such as dynamic random access memory (DRAM), static random access memory (SRAM), double data rate random access memory (DDR RAM) or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a non-transitory computer-readable storage medium.

In some example embodiments, memory 212 or the computer-readable storage medium of memory 212 stores the following programs, modules, and data structures, or a subset thereof:
- an operating system 216 that includes procedures for handling various basic system services and for performing hardware dependent tasks;
- a network communication module 218 that is used for connecting the computer system 102 to other computers via the one or more network interface module(s) 210 (wired or wireless) and one or more communication networks (e.g., communication network 110), such as the Internet, other WANs, LANs, metropolitan area networks, etc.;
- a display module 220 for enabling the information generated by the operating system 216 to be presented visually as needed;

one or more system application modules 221 for handling various aspects of storing and recovering data, including but not limited to:
  an anonymity module 130 for ensuring that data that a user 150 wishes to remain private is prevented from being disclosed outside the computer system 102 by stripping out any personally identifiable information from any sensor 106;
  a stress measurement module 136 for analyzing sensor data about a user's 150 reactions while being presented with a media content item (e.g., a movie, show, audiobook, song, and so on) to estimate a user's 150 stress level at each point during presentation of the media content item;
  a content analysis module 132 for associating an estimated stress level with a particular piece or portion of the media content item, wherein the piece or portion of the media content item is a particular scene or object in a scene;
  a content alteration module 134 for altering a media content item to remove or minimize the portion or piece of the media content item from a displayed media content item by removing the portion, replacing the portion, or blurring out one or more objects;
  an accessing module 224 for accessing user profile data for a user 150 currently viewing a media content item, wherein user profile data includes, but is not limited to, age, location, language, past user responses to stressful content, user preferences, preferences of a parent or guardian, and so on;
  an estimation module 226 for using recorded user response data obtained from one or more sensors 106, to estimate a level of stress that a user 150 is currently experiencing;
  an presentation module 228 for presenting a content item on a presentation device to one or more users and wherein the content item can be presented in two or more distinct content streams to users within a single group (viewing the same content item as a group thought different devices or streams);
  a notification module 230 for notifying a second user 150 e.g., a parent or co-watcher) that a portion of the media content item has been altered in the content presentation device 104 associated with the first user 150;
  an identifying module 232 for identifying a first user 150 viewing media content by associating the user 150 with a user profile in the user profile data 138; and
  a selection module 234 for selecting replacement content, wherein the duration of the replacement content is the approximately the same as the removed portion of the scene from the media content item; and
a system data module(s) 240 for storing data at the computer system 102, including but not limited to:
  a stress data 242 including captured sensor data that the computer system 102 uses to estimate a stress level for a user 150;
  local content item data 140 including data describing each part of the media content item, including what scenes are displayed at which times and which objects are present on the screen at any given point (and any actions that occur) and potentially, each instance of potentially disturbing or stressful content and well as a description of each scene and any particular actions or objects;
  local user profile data 138 including data that describes a user 150 including a user's 150 demographic details, preferences, past viewing experiences, past user reactions, and so on; and
  demographic data 244 including data the describes estimated stress tolerances for users 150 based on general demographic data such as age, location, culture, languages, and any other potentially relevant factors.

Figure 3:
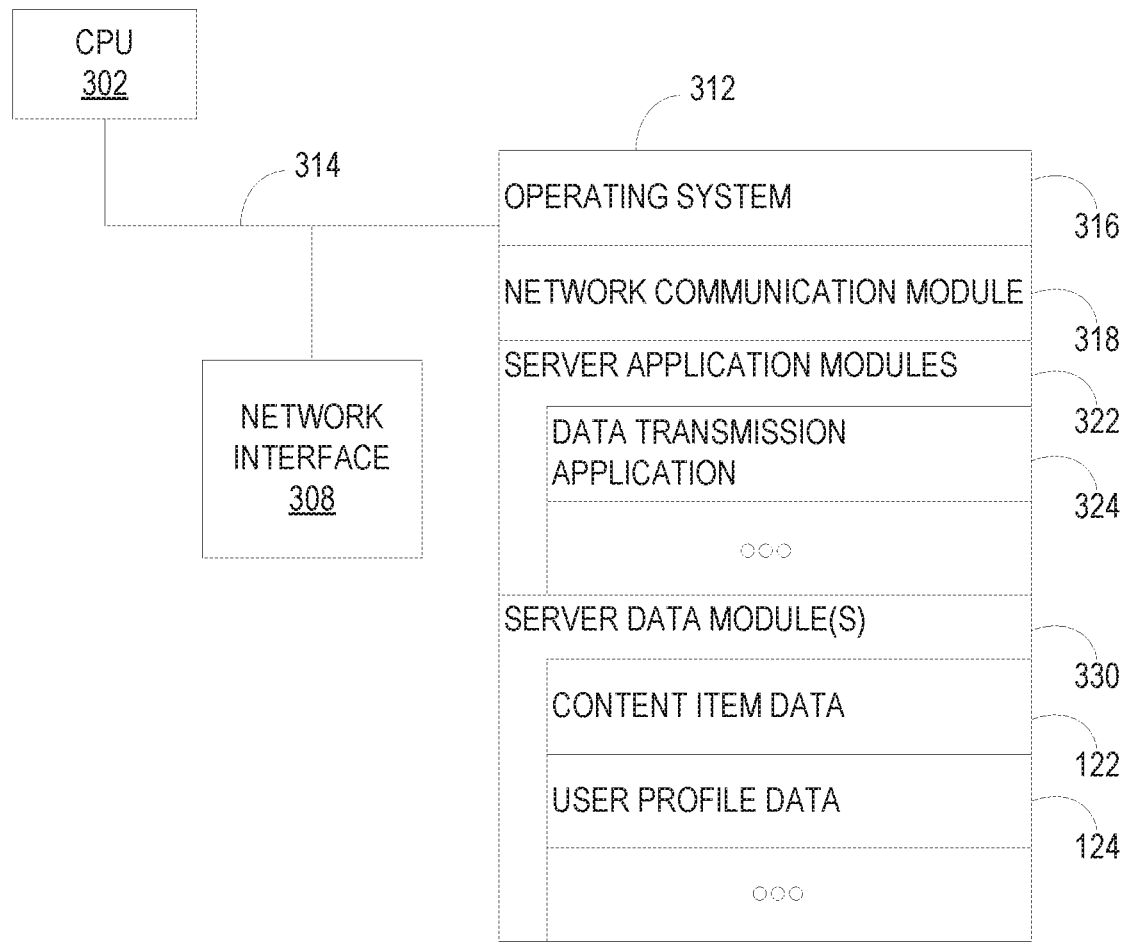
FIG. 3 is a block diagram further illustrating the server system, in accordance with some example embodiments.

FIG. 3 is a block diagram further illustrating the server system 120, in accordance with some example embodiments. Thus, FIG. 3 is an example embodiment of the server system 120 in FIG. 1. The server system 120 typically includes one or more CPUs 302, one or more network interfaces 308, memory 312, and one or more communication buses 314 for interconnecting these components. The memory 312 includes high-speed random-access memory, such as DRAM, SRAM, DDR RAM, or other random-access solid state memory devices; and may include non-volatile memory, such as one or more magnetic disk storage devices, optical disk storage devices, flash memory devices, or other non-volatile solid state storage devices. The memory 312 may optionally include one or more storage devices remotely located from the CPU(s) 302.

The memory 312, or alternatively the non-volatile memory device(s) within the memory 312, comprises a non-transitory computer-readable storage medium. In some example embodiments, the memory 312, or the computer-readable storage medium of the memory 312, stores the following programs, modules, and data structures, or a subset thereof:
  an operating system 316 that includes procedures for handling various basic system services and for performing hardware-dependent tasks;
  a network communication module 318 that is used for connecting the server system 120 to other computers via the one or more network interfaces 308 (wired or wireless) and one or more communication networks 308, such as the Internet, other WANs, LANs, MANS, and so on;
  one or more server application modules 322 for performing the services offered by the server system 120, including but not limited to:
    a data transmission application 324 for transmitting data from the server system 120 to any associated computer systems 102 that need media content item data 122 user profile data 124
  one or more server data modules 330 for storing data needed by the server systems 120, including but not limited to:
    content item data 122 including data describing each part of the media content item, including what scenes are displayed at which times and which objects are present on the screen at any given point (and the any actions that occur) and potentially, each instance of potentially disturbing or stressful content and well as a description of each scene and any particular actions or objects; and
    user profile data 124 including data that describes a user 150 including a user's 150 demographic details, preferences, past viewing experiences, past user reactions, and so on.

Figure 4:
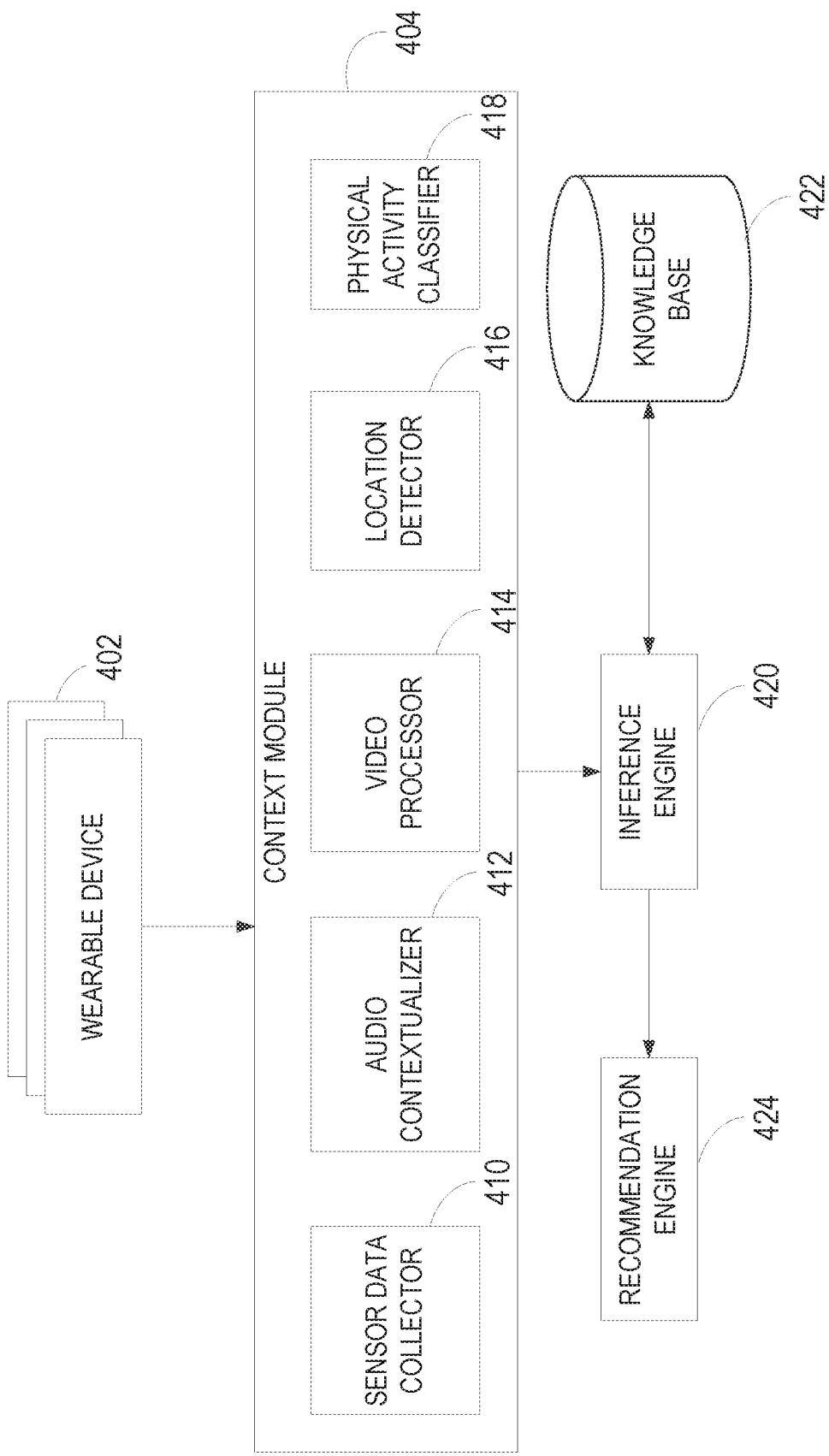
FIG. 4 is a block diagram showing a system for measuring users' stress level and recommending alterations to a presented media content item (e.g., video, audio, interactive media, and so on).

FIG. 4 is a block diagram showing a system for measuring users' 105 stress level and recommending alterations to a presented media content item (e.g., video, audio, interactive media, and so on). In some example embodiments, the system is part of the computer system 102 seen in FIG. 1.

In some example embodiments, the system includes one or more wearable devices 402 such as a smartwatch, a fitness tracker, wearable headbands, shirts or other apparel with integrated computing technology, a wearable clip or belt attachment, a shoe worn or food based wearable computing device, or any other type of wearable computing device. In some example embodiments, the input from these wearable devices 402 (as well as input from cameras and/or microphones) is transmitted to the context module 404.

The context module 404 uses the data (raw input from wearable devices 402) to determine a level of stress for a given user 150. The context module 404 includes a sensor data collector 410 (e.g., data from wearable devices 402, including a user's 150 heart rate, perspiration, skin temperature, galvanic skin response), an audio contextualizer 412 for analyzing audio data to isolate sound created by users 150 and determining the nature of the sound (e.g., using volume and pitch to distinguish a scream from casual speech), a video processor 414 for analyzing received video data to distinguish and identify users 150 who are currently viewing the presented media content item and associating them with user information (e.g., either demographic information or a specific user profile), a location detector 416 for detecting the location and movement of users 150 who are consuming a currently presented media content item, and a physical activity classifier 418 for analyzing motions of users 150 and associating those motions with specific physical activities (e.g., clapping, covering eyes, crouching/looking away from a screen, jumping, and so on).

In some example embodiments, the context module 404 uses data provided by the wearable devices 402, cameras, and microphones, to generate context information about the stress level of a user 150. This information (which consists of an identified user 150 and one or more reactions the user 150 has had to displayed media content items (as determined by the context module 404), is then passed to the inference engine 420.

In some example embodiments, the inference engine 420 uses information about the user's 150 reactions (e.g., a user's 150 scream or elevated heart rate) to infer a stress level for the user 150. For example, a moderately raised heart rate might indicate excitement or enjoyable tension while a very high heart rate may indicate an unacceptable level of stress. In some example embodiments, the inference engine 420 uses a knowledge base 422 to determine what user reactions are indicative of high or unacceptable stress and which are not. For example, the knowledge base 422 includes a table or formula for calculating, given a variety of factors (including base heart rate) a threshold heart rate for different ages of users 150. The inference engine 420 may use this data to determine whether a given heart rate has exceeded that threshold.

In some example embodiments, the knowledge base 422 may also include user preference data, submitted either from the user 150 or a parent/guardian that sets specific thresholds for stress levels. In some example embodiments, the inference engine 420 uses this data to infer whether a given user 150 has exceeded an allowable amount of stress.

In some example embodiments, the inference engine 420 passes the determined stress level to the recommendation engine 424. In some example embodiments, the recommendation engine 424 uses the inferred stress level to recommend content alterations to a currently presented media content item. In some example embodiments, the alterations may include blurring an object or character, skipping or replacing a scene, or editing out certain dialogue. In some example embodiments, the recommendation engine 424 passes recommendations to the content alteration module 134.

Figure 5:
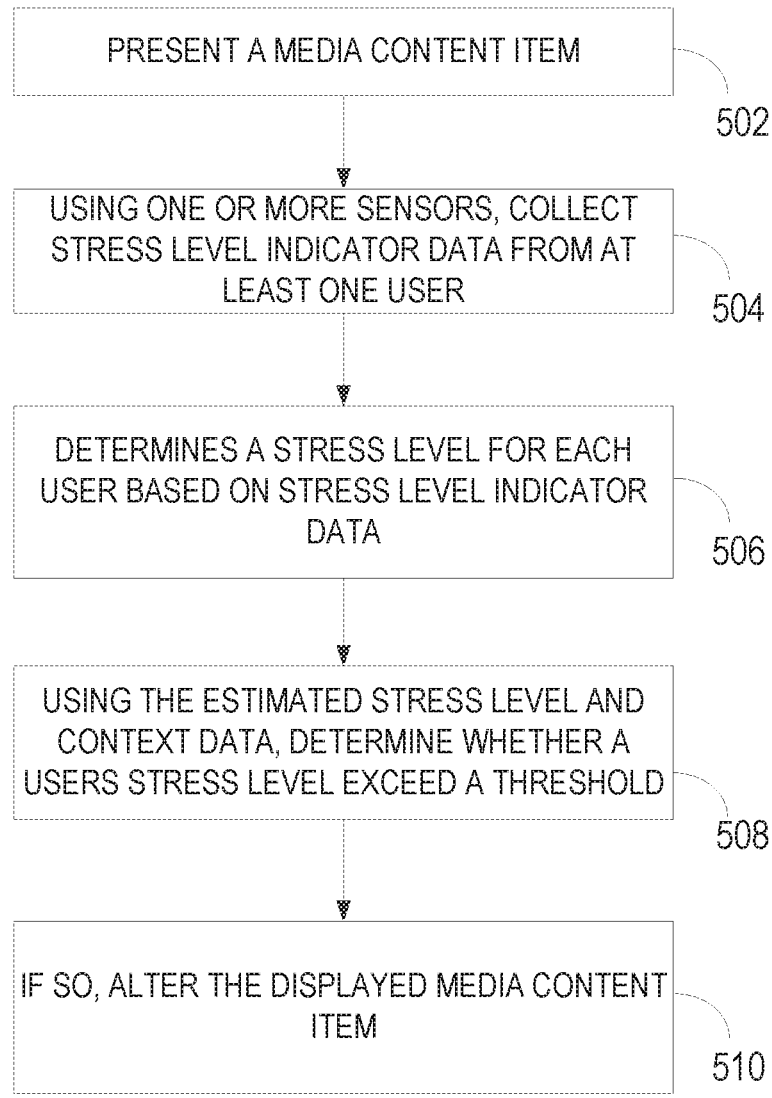
FIG. 5 shows a flow diagram of a method of gathering stress level indicator data from a user or users while presenting a media content item to a user and using that stress level indicator data to recommendation alterations to a presented media content item, in accordance with some example embodiments.

FIG. 5 shows a flow diagram of a method of gathering stress level indicator data from a user or users 150 while presenting a media content item to a user 150 and using that stress level indicator data to recommendation alterations to a presented media content item, in accordance with some example embodiments.

In some example embodiments, the computer system (e.g., the computer system 102 in FIG. 1) presents (502), through one or more content presentation device 104 or other output device, a media content item to one or more users 150. In some example embodiments, each user 150 has a dedicated content presentation device 104 (e.g., personal phones or tablet computers) but all are viewing the same output simultaneously. In other example embodiments, a single content presentation device 104 is used by multiple users 150. In yet other example embodiments, a single content presentation device 104 is able to present a personalized version of the media content item to each user 150 based on their angle of viewing or by using glasses suited for the purpose.

While presenting the media content item, the computer system (e.g., the computer system 102 in FIG. 1) uses one or more sensors 106 (see examples above), to collect (504) stress level indicator data from at least one user 150. In some example embodiments, the stress level indicator data includes, but is not limited to heart rate, perspiration level, galvanic skill response, skin or body temperature, galvanic skin response, motion, sound, and so on.

In some example embodiments, the computer system (e.g., the computer system 102 in FIG. 1) determines (506) a stress level for each user 150 based on the collected stress level indicator data. As noted above, the computer system (e.g., the computer system 102 in FIG. 1) compares measured captured stress level indicator data and compares it to stored reference data to identify particular motions or reactions and to evaluate the stress level with different measurements.

Using the determined stress level, the computer system (e.g., the computer system 102 in FIG. 1) determines (508) whether the determined stress level for a given user 150 has exceeded a threshold. In some example embodiments, the thresholds are predetermined and based on demographic information about the user 150 or explicit user preferences. In other example embodiments, the computer system (e.g., the computer system 102 in FIG. 1) measures a user's 150 reactions to a variety of media content items and builds a stress profile for user 150. The computer system (e.g., the computer system 102 in FIG. 1) may the use this stress profile to determine whether a user's 150 stress indicator data is outside the normal or expected range.

In accordance with a determination that the user's 150 stress level is outside an expected range or beyond a predetermined threshold, the computer system (e.g., the computer system 102 in FIG. 1) alters (510) the displayed media content. In some example embodiments, altering includes removing a scene, replacing a scene, blurring a particular object, character, location, action and so on.

Figure 6A:
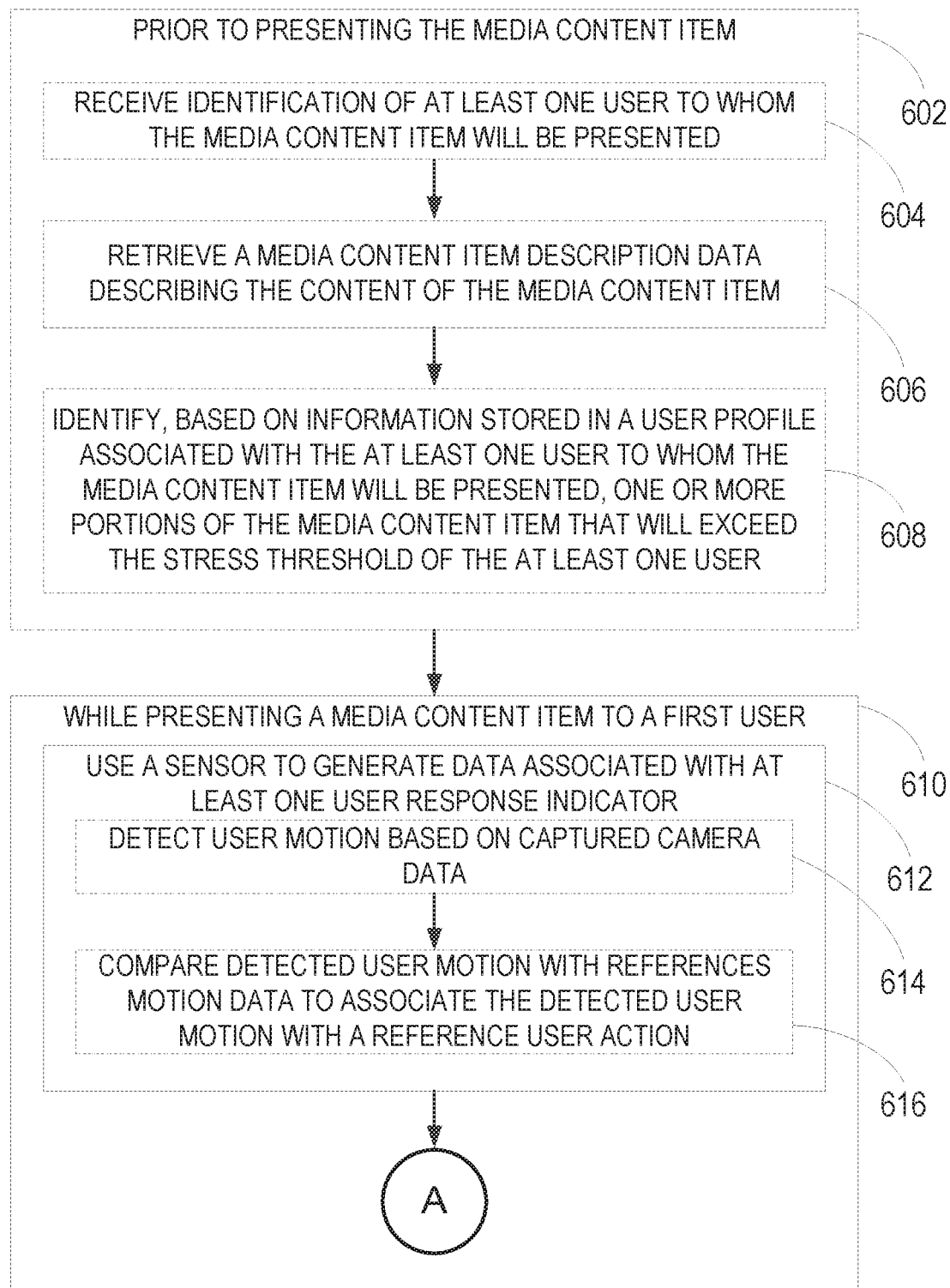
FIGS. 6A-6D are flow diagrams illustrating a method, in accordance with some example embodiments, for measuring user stress level and recommending alterations to a presented media content item (e.g., video, audio, interactive media, and so on).

FIG. 6A is a flow diagram illustrating a method, in accordance with some example embodiments, for measuring users' 150 stress levels and recommending alterations to a presented media content item (e.g., video, audio, interactive media, and so on). Each of the operations shown in FIG. 6A may correspond to instructions stored in a computer memory or computer-readable storage medium. Optional operations are indicated by dashed lines (e.g., boxes with dashed-line borders). In some embodiments, the method described in FIG. 6A is performed by the computer system (e.g., the system 102 in FIG. 1). However, the method described may also be performed by any other suitable configuration of electronic hardware.

In some embodiments, the method is performed by a computer system (e.g., the system 102 in FIG. 1) including one or more processors and memory storing one or more programs for execution by the one or more processors.

In some example embodiments, prior to presenting (602) the media content item, the computer system (e.g., the computer system 102 in FIG. 1) receives (604) identification of at least one user 150 to whom the media content item will be presented. For example, if a particular user 150 selects to play a media content item, the user profile for that user 150 will be identified. In other example embodiments, a parent or guardian may identify one or more users 150 who will watch a given media content item prior to presenting that media content item.

In some example embodiments, the computer system (e.g., the computer system 102 in FIG. 1) retrieves (606) a media content item description describing the content of the media content item. For example a server system (e.g., the server system 120 in FIG. 1) associated with the presentation of the media content item stores detailed information (e.g., a guide) about the content of a media content item. In some example embodiments, this detailed information may be retrieved as needed.

In some example embodiments, the server system (e.g., the server system 120 in FIG. 1) identifies (608), based on information stored in a user profile associated with the at least one user 150 to whom the media content item will be presented, one or more portions of the media content item that will exceed the stress threshold of the at least one user 150. For example, the retrieved information includes a listing of all scenes, objects, characters, and actions and a description detailing potentially stressful portions. In some example embodiments, the retrieved information includes a suggested age or maturity level. This information may be compared against the user profile information of the at least on identified users 150 or the preferences of the parent to identified what content, if any, should be removed or altered.

In some example embodiments, the user profile information may contain a list of past instances where the users' 150 stress level exceed a threshold and the computer system (e.g., the computer system 102 in FIG. 1) may determine whether any similar events are included in the media content item that is going to be presented.

In some example embodiments, while presenting (610) a media content item to a first user, the computer system (e.g., the computer system 102 in FIG. 1) uses (612) one or more sensors 106 to generate data associated with at least one user response indicator. In some example embodiments, the one or more sensors 106 is one of a microphone, a camera, a perspiration detector, and a heart rate monitor. In some example embodiments, the user response indicators include at least one of physical movement, heart rate, audio responses, and galvanic skin response.

In some example embodiments, the one or more sensors 106 is a camera and generating data associated with at least one user's 150 response indicator further comprises the computer system (e.g., the computer system 102 in FIG. 1) detecting (614) user motion based on captured camera data. In some example embodiments, the computer system (e.g., the computer system 102 in FIG. 1) compares (616) detected user motion with references motion data to associate the detected user motion with a reference user action.

For example, the computer system (e.g., the computer system 102 in FIG. 1) contains a list of reference user actions (e.g., leaning forward, jumping, covering eyes, falling asleep, laying down, and so on). The computer system (e.g., the computer system 102 in FIG. 1) compares the captured user motion data to reference data describing reference user actions and classifies the user motion as the same or similar to a reference user action. In some example embodiments, the classification is assigned a confidence level based on the degree of the match.

Figure 6B:
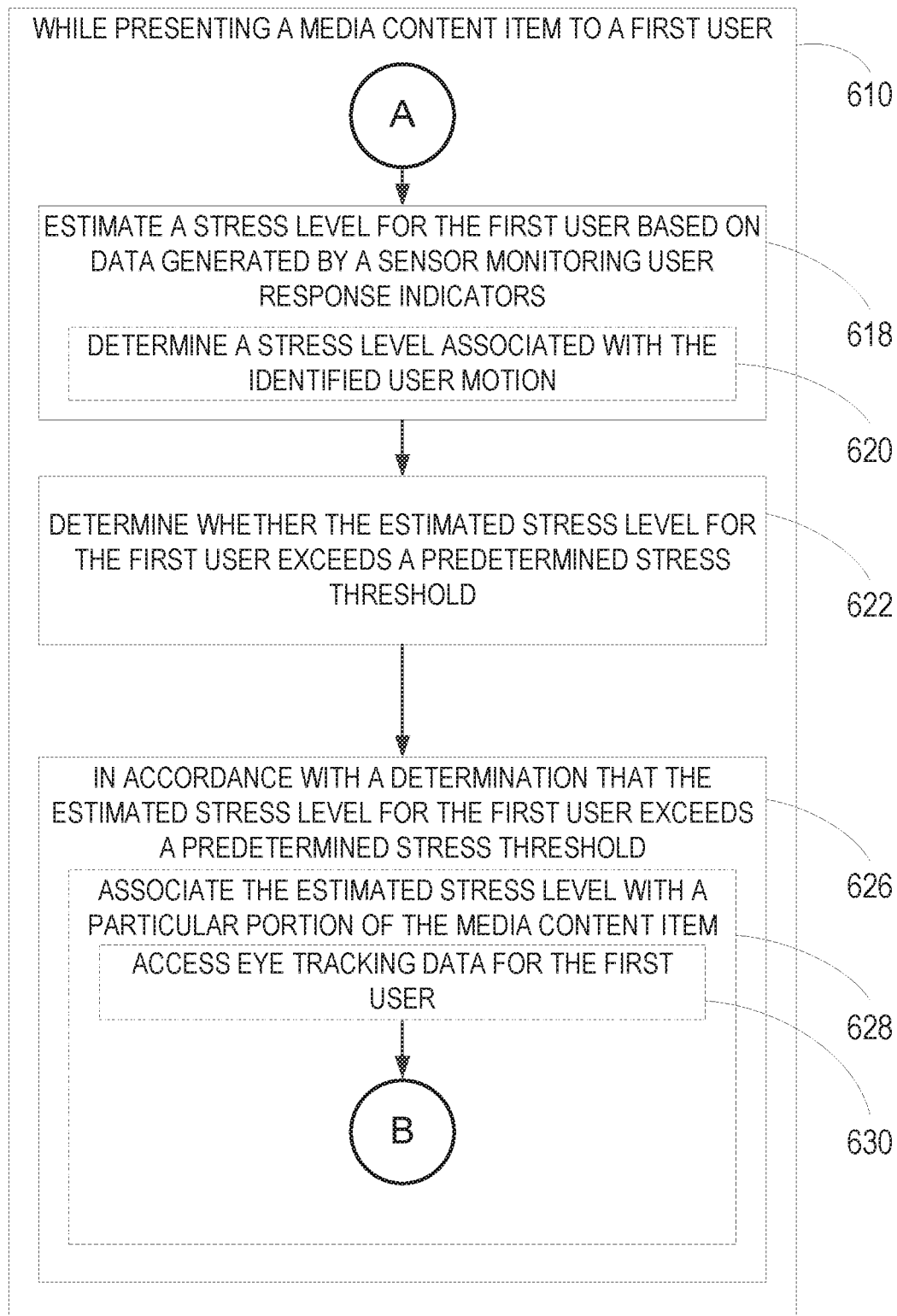

FIG. 6B is a flow diagram illustrating a method, in accordance with some example embodiments, for measuring users' 150 stress level and recommending alterations to a presented media content item (e.g., video, audio, interactive media, and so on). Each of the operations shown in FIG. 6B may correspond to instructions stored in a computer memory or computer-readable storage medium. Optional operations are indicated by dashed lines (e.g., boxes with dashed-line borders). In some embodiments, the method described in FIG. 6B is performed by the computer system (e.g., the system 102 in FIG. 1). However, the method described may also be performed by any other suitable configuration of electronic hardware.

In some embodiments, the method is performed by a computer system (e.g., the system 102 in FIG. 1) including one or more processors and memory storing one or more programs for execution by the one or more processors.

In some example embodiments, the computer system (e.g., the computer system 102 in FIG. 1) estimates (618) a stress level for the first user based on data generated by one or more sensors 106 monitoring user response indicators. In some example embodiments, this estimation is done by comparing existing stress level data (either data for the specific user 150 that has been gathered in the past or data on users 150 generally, aggregated together) to determine, for example, whether the user's 150 current heart rate is outside of expected levels. The more a given user response indicator is outside of an expected or acceptable level, the higher the estimated level of stress.

In some example embodiments, when the user response data is a reference user motion, the computer system (e.g., the computer system 102 in FIG. 1) may determine (620) a stress level associated with the identified reference user motion. For example, leaning back in a relaxed position may be identified with a low stress level, while a sudden jump is associated with a higher stress level, and a user 150 covering their eyes or looking away from the screen is associated with a yet even higher stress level.

In some example embodiments, the computer system (e.g., the computer system 102 in FIG. 1) determines (622) whether the estimated stress level for the first user exceeds a predetermined stress threshold. In some example embodiments, the stress level for a user 150 is represented by a value between 0 (representing no stress) and 1 (representing a theoretical maximum stress level). Each user 150 may have a stress threshold assigned based on that user's 150 age, location, and preferences. Thus, each stress level that is determined for a user 150 may be compared against this threshold to determine whether the s tress level has exceeded it.

In some example embodiments, the stress threshold for a user 150 may be determined by accessing a user profile for the first user 150 and using that information to identify a threshold stress level for the user 150. In some example embodiments, the user information includes demographic information for the user 150. In some example embodiments, the user information includes past user reactions to stressful content. Thus, if a user 150 has reactions in a particular range in the past, then reactions outside of that range may be determined to be outside of the stress threshold.

In accordance with a determination that the estimated stress level for the first user 150 exceeds a predetermined stress threshold (626), the computer system (e.g., the computer system 102 in FIG. 1) associates (628) the estimated stress level with a particular portion of the media content item. This may be based on the time of that the heightened stress level began or the position on the screen that the user 150 was or is viewing.

In some example embodiments, the computer system (e.g., the computer system 102 in FIG. 1) accesses (630) eye tracking data for the first user 150.

Figure 6C:
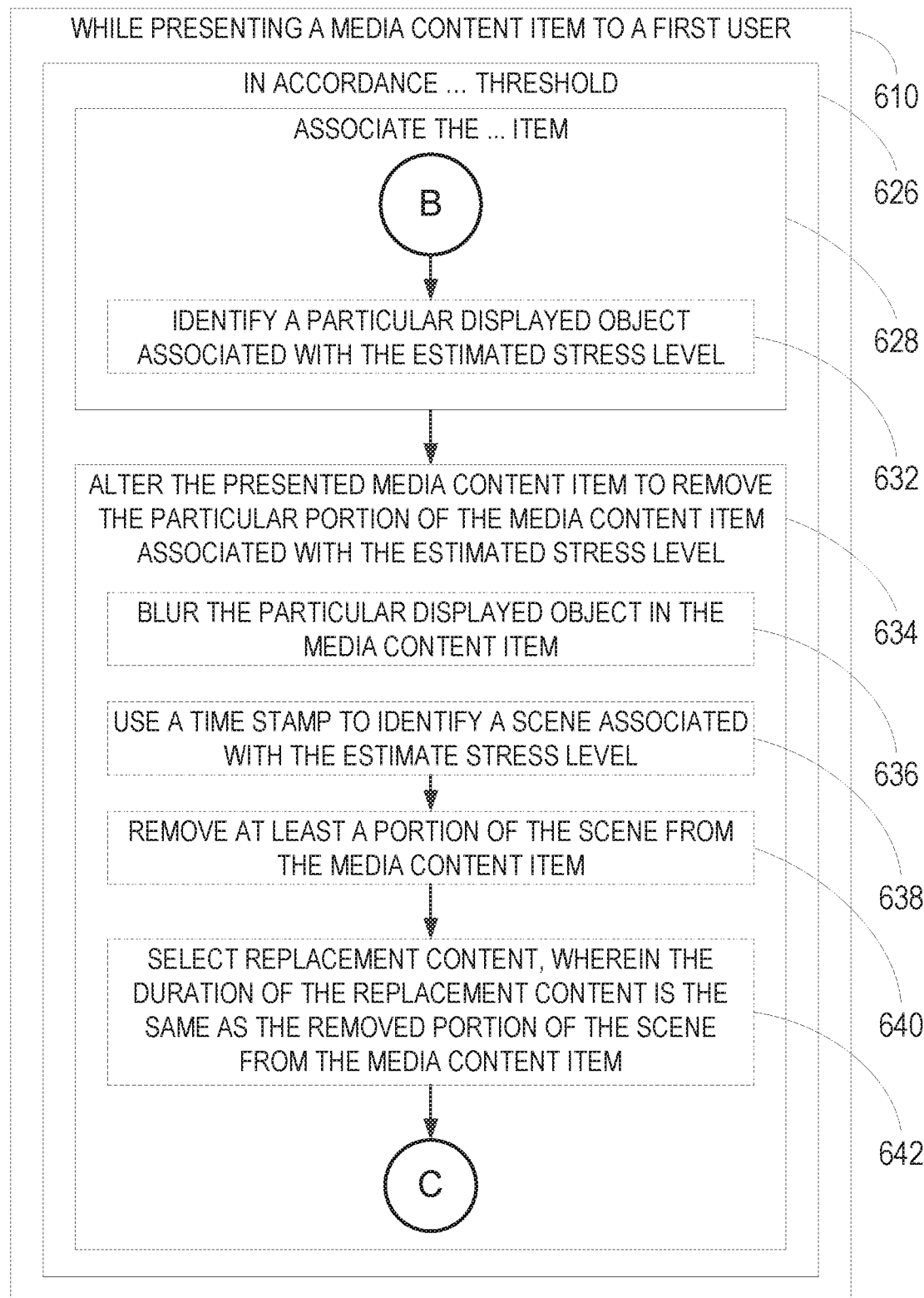

FIG. 6C is a flow diagram illustrating a method, in accordance with some example embodiments, for measuring a user's 150 stress level and recommending alterations to a presented media content item (e.g., video, audio, interactive media, and so on). Each of the operations shown in FIG. 6C may correspond to instructions stored in a computer memory or computer-readable storage medium. Optional operations are indicated by dashed lines (e.g., boxes with dashed-line borders). In some embodiments, the method described in FIG. 6C is performed by the computer system (e.g., the computer system 102 in FIG. 1). However, the method described may also be performed by any other suitable configuration of electronic hardware.

In some embodiments, the method is performed by a computer system (e.g., the computer system 102 in FIG. 1) including one or more processors and memory storing one or more programs for execution by the one or more processors.

Based on the accessed eye tracking data for the first user, the computer system (e.g., the computer system 102 in FIG. 1) identifies a particular displayed object associated with the estimated stress level (632).

In some example embodiments, the computer system (e.g., the computer system 102 in FIG. 1) alters the presented media content item to remove the particular portion of the media content item associated with the estimated stress level (634). If the particular portion is a displayed object, the computer system (e.g., the computer system 102 in FIG. 1) blurs (636) the particular displayed object in the media content item.

In some example embodiments, the computer system (e.g., the computer system 102 in FIG. 1) uses a time stamp to identify a scene associated with the estimate stress level. For example, when a user's 150 stress level exceeds a predetermined threshold a timestamp is generated. Using this timestamp, the computer system (e.g., the computer system 102 in FIG. 1) identifies the scene being displayed at that timestamp (638). In some example embodiments, the computer system (e.g., the computer system 102 in FIG. 1) removes (640) at least a portion of the scene from the media content item. In some example embodiments, the computer system (e.g., the computer system 102 in FIG. 1) just skips to the next scene.

In other example embodiments, the computer system (e.g., the computer system 102 in FIG. 1) selects (642) replacement content, wherein the duration of the replacement content is the same as the removed portion of the scene from the media content item. Potential replacement content is an alternate version of the scene without at least some of the potentially stressful content altered or removed. In other example embodiments, the replacement content is supplementary content (e.g., making of content, outtakes, commentaries, and so on). In other example embodiments, the supplementary content is not specifically associated with the media content item but is based on the user's 150 existing interests and preferences.

Figure 6D:
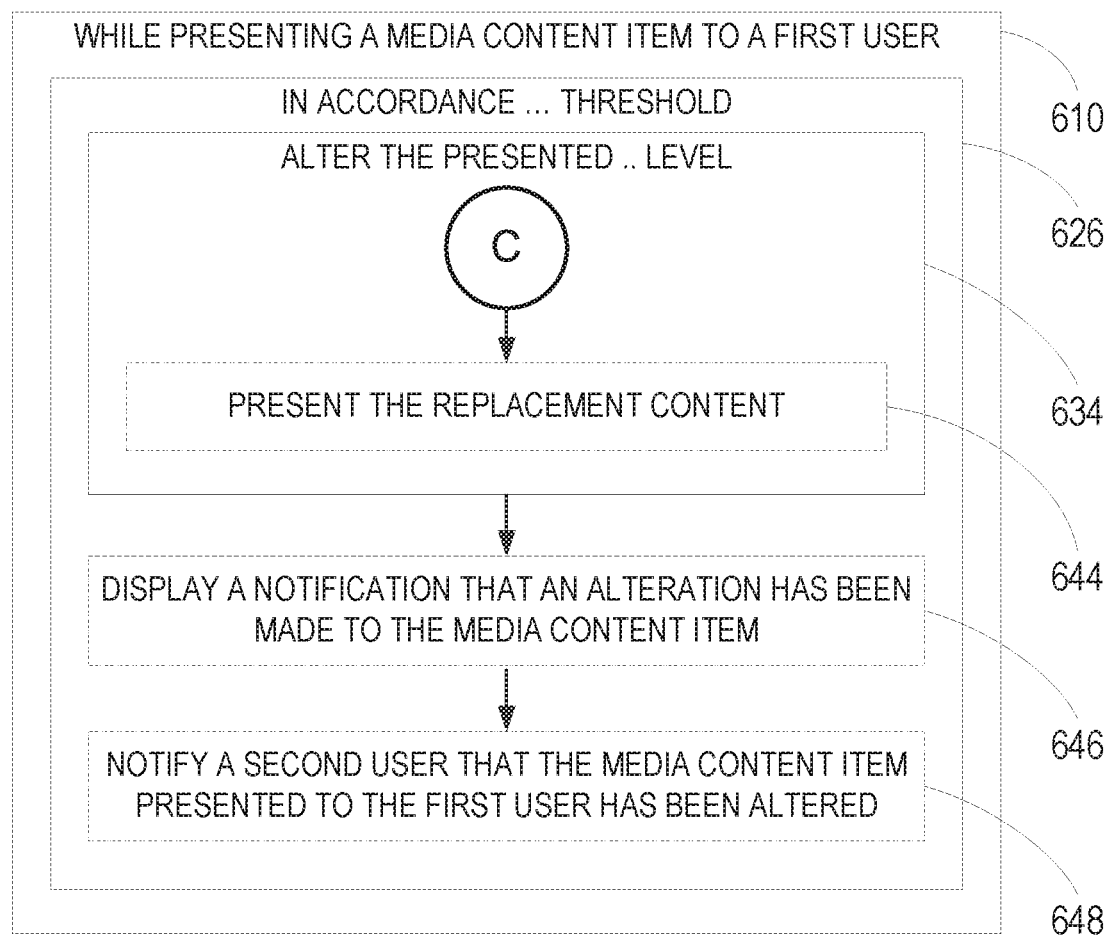

FIG. 6D is a flow diagram illustrating a method, in accordance with some example embodiments, for measuring a user's 150 stress level and recommending alterations to a presented media content item (e.g., video, audio, interactive media, and so on). Each of the operations shown in FIG. 6D may correspond to instructions stored in a computer memory or computer-readable storage medium. Optional operations are indicated by dashed lines (e.g., boxes with dashed-line borders). In some embodiments, the method described in FIG. 6D is performed by the computer system (e.g., the computer system 102 in FIG. 1). However, the method described may also be performed by any other suitable configuration of electronic hardware.

In some embodiments, the method is performed by a computer system (e.g., the computer system 102 in FIG. 1) including one or more processors and memory storing one or more programs for execution by the one or more processors.

In some example embodiments, the computer system (e.g., the computer system 102 in FIG. 1) presents (644) the replacement content. In some example embodiments, the computer system (e.g., the computer system 102 in FIG. 1) displays (646) a notification that an alteration has been made to the media content item. In some example embodiments, the computer system (e.g., the computer system 102 in FIG. 1) notifies (648) a second user that the media content item presented to the first user has been altered.

In some example embodiments, the computer system (e.g., the computer system 102 in FIG. 1) presents a single media content item in two distinct content streams, the first content stream presented to at least a first user and a second content stream presented to at least a second user. The computer system (e.g., the computer system 102 in FIG. 1) uses sensor generated data to measure at least one user response indicator for the first user and at least one user response indicator for the second user.

In some example embodiments, the computer system (e.g., the computer system 102 in FIG. 1) estimates a stress level for the first user based on at least one measured user response indicator for the first user. In some example embodiments, the computer system (e.g., the computer system 102 in FIG. 1) also estimates a stress level for the second user based on at least one measured user response indicator for the second user.

In some example embodiments, computer system (e.g., the computer system 102 in FIG. 1) determines whether the estimated stress level for the first user exceeds a first predetermined stress threshold.

In some example embodiments, the computer system (e.g., the computer system 102 in FIG. 1) determines whether the estimated stress level for the second user exceeds a second predetermined stress threshold. In accordance with a determination that the estimated stress level for the first user exceeds a first predetermined stress threshold and the estimated stress level for the second user does not exceed a second predetermined threshold the computer system (e.g., the computer system 102 in FIG. 1) associates the estimated stress level for the first user with a particular portion of the media content item; and alters the first stream of the presented media content item to modify the particular portion of the media content item associated with the estimated stress level for the first user without altering the second stream of the presented media content, wherein the first stream is altered such that it remains in sync with the second stream once the particular portion of the media content item has been presented.

Figure 7:
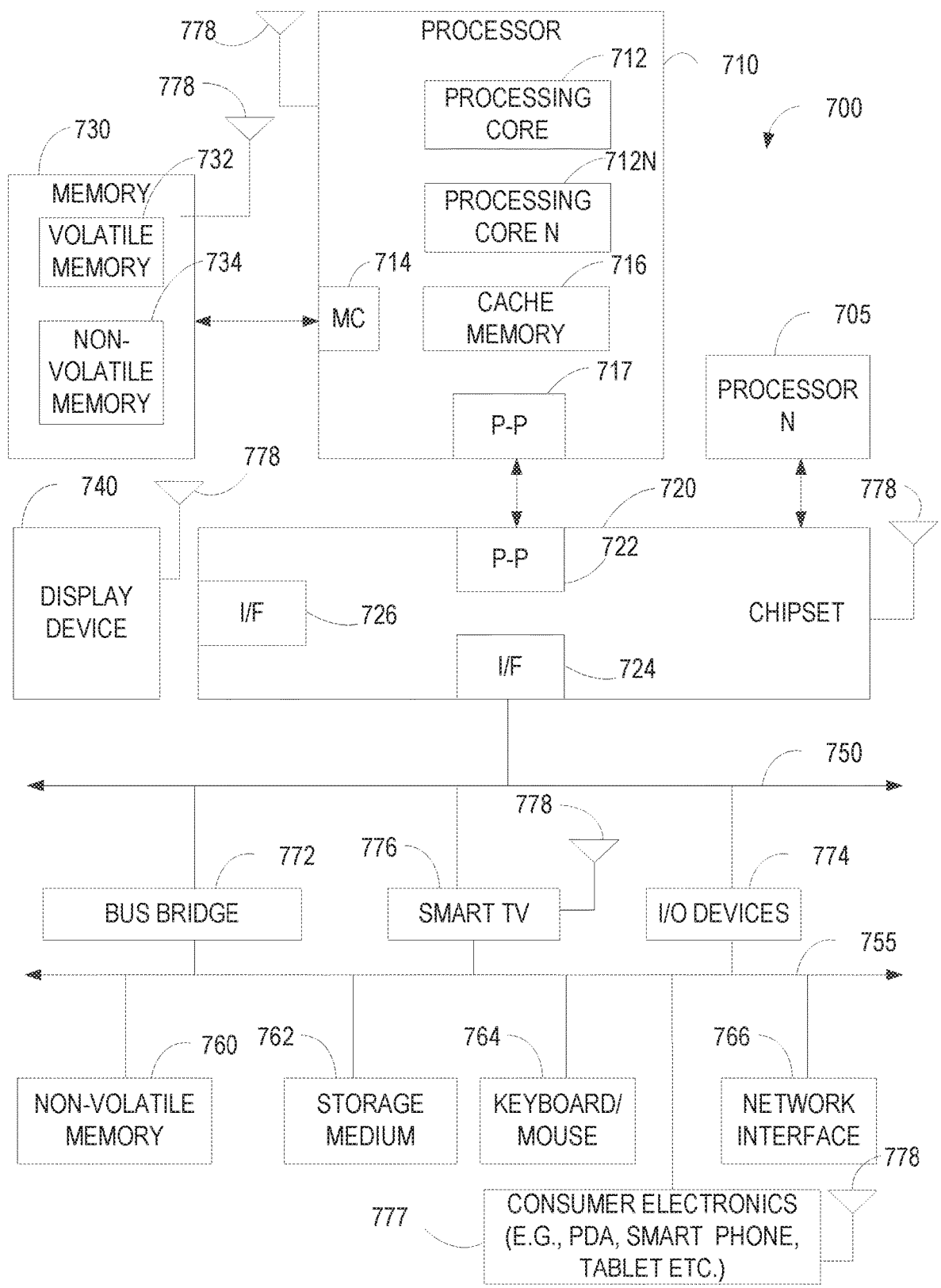
FIG. 7 illustrates a system level diagram, according to one example embodiment.

FIG. 7 illustrates a system level diagram, according to one example embodiment. For instance, FIG. 7 depicts an example of an electronic device (e.g., system) 700 as described in the present disclosure. FIG. 7 is included to show an example of a higher level device application. In one embodiment, the system 700 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 700 is a system on a chip (SOC) system.

In one embodiment, processor 710 has one or more processing cores 712 and 712N, where 712N represents the nth processor core inside processor 710 where N is a positive integer. In one embodiment, system 700 includes multiple processors including 710 and 705, where processor 705 has logic similar or identical to the logic of processor 710. In some embodiments, processing core 712 includes, but is not limited to, pre-fetch logic to fetch instructions, decode logic to decode the instructions, execution logic to execute instructions, and the like. In some embodiments, processor 710 has a cache memory 716 to cache instructions and/or data for system 700. Cache memory 716 may be organized into a hierarchal structure including one or more levels of cache memory 716.

In some embodiments, processor 710 includes a memory controller 714, which is operable to perform functions that enable the processor 710 to access and communicate with memory 730 that includes a volatile memory 732 and/or a non-volatile memory 734. In some embodiments, processor 710 is coupled with memory 730 and ellipse 720. Processor 710 may also be coupled to a wireless antenna 778 to communicate with any device configured to transmit and/or receive wireless signals. In one embodiment, the wireless antenna 778 operates in accordance with, but is not limited to, the IEEE 802.11 standard and its related family, Home Plug AV (HPAV), ultra-wide band (UWB), Bluetooth, WiMax, or any form of wireless communication protocol.

In some embodiments, volatile memory 732 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 734 includes, but is not limited to, flash memory, phase change memory (PCM), read-only memory (ROM), electrically erasable programmable read-only memory (EEPROM), or any other type of non-volatile memory 734 device.

Memory 730 stores information and instructions to be executed by processor 710. In one embodiment, memory 730 may also store temporary variables or other intermediate information while processor 710 is executing instructions. In the illustrated embodiment, chipset 720 connects with processor 710 via Point-to-Point (PtP or P-P) interfaces 717 and 722. Chipset 720 enables processor 710 to connect to other elements in system 700. In some embodiments, interfaces 717 and 722 operate in accordance with a PtP communication protocol such as the Intel® QuickPath Interconnect (QPI) or the like. In other embodiments, a different interconnect may be used.

In some embodiments, chipset 720 is operable to communicate with processors 710, 705N, display device 740, and other devices 772, 776, 774, 760, 762, 764, 766, 777, and so forth. Chipset 720 may also be coupled to a wireless antenna 778 to communicate with any device configured to transmit and/or receive wireless signals.

Chipset 720 connects to display device 740 via interface 726. Display device 740 may be, for example, a liquid crystal display (LCD), a plasma display, cathode ray tube (CRT) display, or any other form of visual display device. In some embodiments, processor 710 and chipset 720 are merged into a single SOC. In addition, chipset 720 connects to one or more buses 750 and 755 that interconnect various elements 774, 760, 762, 764, and 766. Buses 750 and 755 may be interconnected together via a bus bridge 772. In one embodiment, chipset 720 couples with a non-volatile memory 760, mass storage device(s) 762, keyboard/mouse 764, and network interface 766 via interface 724 and/or smart television 776, consumer electronics 777, and so forth.

In one embodiment, mass storage device 762 includes, but is not limited to, a solid state drive, a hard disk drive, a universal serial bus flash memory drive, or any other form of computer data storage medium. In one embodiment, network interface 766 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, HPAV, UWB, Bluetooth, WiMax, or any form of wireless communication protocol.

While the modules shown in FIG. 7 are depicted as separate blocks within the system 700, the functions performed by some of these blocks may be integrated within a single semiconductor circuit or may be implemented using two or more separate integrated circuits (e.g., processing circuitry). For example, although cache memory 716 is depicted as a separate block within processor 710, cache memory 716 (or selected aspects of 716) may be incorporated into processing core 712.

Additional Notes and Examples

Example 1 is a system for alteration of media content based on stress monitoring, the system comprising: a memory including instructions; and processing circuitry that, when in operation, is configured by the instructions to implement: a presentation module to present a single media content item in two distinct content streams, the first content stream presented to at least a first user and a second content stream presented to at least a second user; an accessing module to use sensor generated data to obtain at least one user response indicator for the first user and at least one user response indicator for the second user; an estimation module to: estimate a stress level for the first user based on at least one measured user response indicator for the first user; and estimate a stress level for the second user based on at least one measured user response indicator for the second user; a stress measurement module to: determine whether the estimated stress level for the first user exceeds a first predetermined stress threshold; and determine whether the estimated stress level for the second user exceeds a second predetermined stress threshold; and a content alteration module to, in accordance with a determination that the estimated stress level for the first user exceeds the first predetermined stress threshold and the estimated stress level for the second user does not exceed the second predetermined threshold: associate the estimated stress level for the first user with a particular portion of the media content item; and alter the first stream of the presented media content item to modify the particular portion of the media content item associated with the estimated stress level for the first user without altering the second stream of the presented media content.

In Example 2, the subject matter of Example 1 optionally includes wherein the first stream is altered such that it remains in sync with the second stream once the particular portion of the media content item has been presented.

In Example 3, the subject matter of any one or more of Examples 1-2 optionally include wherein the sensor is one of a microphone, a camera, and a heartrate monitor.

In Example 4, the subject matter of any one or more of Examples 1-3 optionally include wherein the user response indicator includes at least one of physical movement, heart rate, audio responses, skin temperature, or galvanic skin response.

In Example 5, the subject matter of any one or more of Examples 1-4 optionally include wherein the content alteration module further uses the at least one processor to access eye tracking data for the first user; based on the accessed eye tracking data for the first user, identify a particular displayed object associated with the estimated stress level; and blur the particular displayed object in the media content item.

In Example 6, the subject matter of Example 5 optionally includes wherein the content alteration module further uses the at least one processor to: identify a scene associated with the estimate stress level; and remove at least a portion of the scene from the media content item.

In Example 7, the subject matter of Example 6 optionally includes wherein the instructions configure the processing circuitry to implement: a selection module to select replacement content, wherein the duration of the replacement content is the approximately the same as the removed portion of the scene from the media content item; and a presentation module, using at least one processor to present the replacement content.

In Example 8, the subject matter of any one or more of Examples 1-7 optionally include wherein the sensor is a camera and the accessing module further uses at least one processor to: detect user motion of the first user based on received camera data; and compare detected user motion of the first user with reference motion data to identify the user motion.

In Example 9, the subject matter of Example 8 optionally includes wherein the estimation module further uses at least one processor to determine a stress level associated with the identified user motion.

In Example 10, the subject matter of any one or more of Examples 1-9 optionally include wherein the stress measurement engine further uses the at least one processor to: access a user profile for the first user; and based on user information in the user profile, identify a threshold stress level for the user.

In Example 11, the subject matter of Example 10 optionally includes wherein the user information includes demographic information for the user.

In Example 12, the subject matter of any one or more of Examples 10-11 optionally include wherein the user information includes past user reactions to stressful content.

In Example 13, the subject matter of any one or more of Examples 1-12 optionally include wherein the instructions configure the processing circuitry to implement: a content analysis module, prior to presenting the media content item, to: receive identification of at least one user to whom the media content item will be presented; retrieve media content item description data describing the content of the media content item; and identify, based on information stored in a user profile associated with the at least one user to whom the media content item will be presented, one or more portions of the media content item that will exceed the stress threshold of the at least one user.

In Example 14, the subject r of any one or more of Examples 1-13 optionally include wherein the instructions configure the processing circuitry to implement: a display module to display a notification that an alteration has been made to the media content item.

In Example 15, the subject matter of any one or more of Examples 1-14 optionally include wherein the instructions configure the processing circuitry to implement: a notification module to notify a second user that the media content item presented to the first user has been altered.

Example 16 is a method for alteration of media content based on stress monitoring, the method comprising: presenting a media item in two distinct streams, the first stream presented to a first user and a second stream presented to a second user; using sensor generated data to estimate a stress level for the first user and the second user; determining whether the estimated stress level for the first user exceeds a first predetermined stress threshold and whether the estimated stress level for the second user exceeds a second predetermined stress threshold; and in accordance with a determination that the estimated stress level for the first user exceeds a first predetermined stress threshold and the estimated stress level for the second user does not exceed a second predetermined threshold: altering the first stream of the media item to modify a particular portion of the media item associated with the estimated stress level for the first user without altering the second stream of the media item.

In Example 17, the subject matter of Example 16 optionally includes wherein the sensor is one of a microphone, a camera, and a heartrate monitor.

In Example 18, the subject matter of any one or more of Examples 16-17 optionally include wherein the sensor generated data measures at least one user response indicator including at least one of physical movement, heart rate, audio responses, skin temperature, or galvanic skin response.

In Example 19, the subject matter of Example 18 optionally includes wherein the sensor is a camera and using sensor generated data to obtain at least one user response indicator for the first user further comprises: detecting user motion of the first user based on received camera data; and comparing detected user motion of the first user with reference motion data to identify the user motion.

In Example 20, the subject matter of Example 19 optionally includes wherein estimating a stress level for the first user further comprises: determining a stress level associated with the identified user motion.

In Example 21, the subject matter of any one or more of Examples 16-20 optionally include wherein determining whether the estimated stress level for the first user exceeds a first predetermined stress threshold further comprises: accessing a user profile for the first user; and based on user information in the user profile, identifying a threshold stress level for the user.

In Example 22, the subject matter of Example 21 optionally includes wherein the user information includes demographic information for the user.

In Example 23, the subject matter of any one or more of Examples 21-22 optionally include wherein the user information includes past user reactions to stressful content.

In Example 24, the subject matter of any one or more of Examples 16-23 optionally include prior to presenting the media item: receiving identification of at least one user to whom the media content item will be presented; retrieving media item description data describing the content of the media item; and identifying, based on information stored in a user profile associated with the at least one user to whom the media item will be presented, one or more portions of the media item that will exceed the stress threshold of the at least one user.

In Example 25, the subject matter of any one or more of Examples 16-24 optionally include displaying a notification that an alteration has been made to the media content item.

In Example 26, the subject matter of any one or more of Examples 16-25 optionally include notifying a second user that the media content item presented to the first user has been altered.

In Example 27, the subject matter of any one or more of Examples 16-26 optionally include wherein altering the presented media content item to modify the particular portion of the media content item associated with the estimated stress level further comprises: identifying a scene associated with the estimate stress level; and removing at least a portion of the scene from the media content item.

In Example 28, the subject matter of any one or more of Examples 16-27 optionally include wherein the first stream is altered such that it remains in sync with the second stream once the particular portion of the media content item has been presented.

Example 29 is at least one computer-readable storage medium storing instructions that, when executed by the one or more processors of a machine, cause the machine to perform any of the methods of Examples 16-28.

Example 30 is an apparatus comprising means for performing any of the methods of Examples 16-28.

Example 31 is at least one computer-readable storage medium storing instructions that, when executed by the one or more processors of a machine, cause the machine to: present a single media content item in two distinct content streams, the first content stream presented to at least a first user and a second content stream presented to at least a second user; use sensor generated data to obtain at least one user response indicator for the first user and at least one user response indicator for the second user; estimate a stress level for the first user based on at least one measured user response indicator for the first user; estimate a stress level for the second user based on at least one measured user response indicator for the second user; determine whether the estimated stress level for the first user exceeds a first predetermined stress threshold; determine whether the estimated stress level for the second user exceeds a second predetermined stress threshold; in accordance with a determination that the estimated stress level for the first user exceeds a first predetermined stress threshold and the estimated stress level for the second user does not exceed a second predetermined threshold: associate the estimated stress level for the first user with a particular portion of the media content item; and alter the first stream of the presented media content item to modify the particular portion of the media content item associated with the estimated stress level for the first user without altering the second stream of the presented media content.

In Example 32, the subject matter of Example 31 optionally includes wherein the first stream is altered such that it remains in sync with the second stream once the particular portion of the media content item has been presented.

In Example 33, the subject matter of any one or more of Examples 31-32 optionally include wherein the sensor is one of a microphone, a camera, and a heartrate monitor.

In Example 34, the subject matter of any one or more of Examples 31-33 optionally include wherein the stress level indicators include at least one of physical movement, heart rate, audio responses, skin temperature, or galvanic skin response.

In Example 35, the subject matter of any one or more of Examples 31-34 optionally include wherein the sensor is a camera and using sensor generated data to obtain at least one user response indicator for the first user further comprises: detecting user motion of the first user based on received camera data; and comparing detected user motion of the first user with reference motion data to identify the user motion.

In Example 36, the subject matter of Example 35 optionally includes wherein the instructions that cause the machine to estimate a stress level for the first user based on at least one measured user response indicator for the first user further comprise instructions to: determine a stress level associated with the identified user motion.

In Example 37, the subject matter of any one or more of Examples 31-36 optionally include wherein the instructions that cause the machine to determine whether the estimated stress level for the first user exceeds a first predetermined stress threshold further comprise instructions to: access a user profile for the first user; and based on user information in the user profile, identify a threshold stress level for the user.

In Example 38, the subject matter of Example 37 optionally includes wherein the user information includes demographic information for the user.

In Example 39, the subject matter of Example 38 optionally includes wherein the user information includes past user reactions to stressful content.

In Example 40, the subject matter of any one or more of Examples 31-39 optionally include instructions that cause the machine to: prior to presenting the media content item: receive identification of at least one user to whom the media content item will be presented; retrieve media content item description data describing the content of the media content item; and identify, based on information stored in a user profile associated with the at least one user to whom the media content item will be presented, one or more portions of the media content item that will exceed the stress threshold of the at least one user.

In Example 41, the subject matter of any one or more of Examples 31-40 optionally include instructions that cause the machine to: displaying a notification that an alteration has been made to the media content item.

In Example 42, the subject matter of any one or more of Examples 31-41 optionally include instructions that cause the machine to: notifying a second user that the media content item presented to the first user has been altered.

In Example 43, the subject matter of any one or more of Examples 31-42 optionally include wherein the instructions that cause the machine to alter the presented media content item to modify the particular portion of the media content item associated with the estimated stress level further comprise instructions that cause the machine to: identify a scene associated with the estimate stress level; and remove at least a portion of the scene from the media content item.

Example 44 is an apparatus for alteration of media content based on stress monitoring, the apparatus comprising: means for presenting a single media content item in two distinct content streams, the first content stream presented to at least a first user and a second content stream presented to at least a second user; means for using sensor generated data to obtain at least one user response indicator for the first user and at least one user response indicator for the second user;

means for estimating a stress level for the first user based on at least one measured user response indicator for the first user; means for estimating a stress level for the second user based on at least one measured user response indicator for the second user; means for determining whether the estimated stress level for the first user exceeds a first predetermined stress threshold; means for determining whether the estimated stress level for the second user exceeds a second predetermined stress threshold; and means for, in accordance with a determination that the estimated stress level for the first user exceeds a first predetermined stress threshold and the estimated stress level for the second user does not exceed a second predetermined threshold: associating the estimated stress level for the first user with a particular portion of the media content item; and altering the first stream of the presented media content item to modify the particular portion of the media content item associated with the estimated stress level for the first user without altering the second stream of the presented media content.

In Example 45, the subject matter of Example 44 optionally includes wherein the first stream is altered such that it remains in sync with the second stream once the particular portion of the media content item has been presented.

In Example 46, the subject matter of any one or more of Examples 44-45 optionally include wherein the sensor is one of a microphone, a camera, and a heartrate monitor.

In Example 47, the subject matter of any one or more of Examples 44-46 optionally include wherein the stress level indicators include at least one of physical movement, heart rate, audio responses, skin temperature, or galvanic skin response.

In Example 48, the subject matter of any one or more of Examples 44-47 optionally include wherein the sensor is a camera and the means for using sensor generated data to obtain at least one user response indicator for the first user further comprises: means for detecting user motion of the first user based on received camera data; and means for comparing detected user motion of the first user with reference motion data to identify the user motion.

In Example 49, the subject matter of Example 48 optionally includes wherein the means for estimating a stress level for the first user based on at least one measured user response indicator for the first user further comprises: means for determining a stress level associated with the identified user motion.

In Example 50, the subject matter of any one or more of Examples 44-49 optionally include wherein the means for determining whether the estimated stress level for the first user exceeds a first predetermined stress threshold further comprise: means for accessing a user profile for the first user; and means for, based on user information in the user profile, identifying a threshold stress level for the user.

In Example 51, the subject matter of Example 50 optionally includes wherein the user information includes demographic information for the user.

In Example 52, the subject matter of any one or more of Examples 50-51 optionally include wherein the user information includes past user reactions to stressful content.

In Example 53, the subject matter of any one or more of Examples 44-52 optionally include means for prior to presenting the media content item: receiving identification of at least one user to whom the media content item will be presented; retrieving media content item description data describing the content of the media content item; and identifying, based on information stored in a user profile associated with the at least one user to whom the media content item will be presented, one or more portions of the media content item that will exceed the stress threshold of the at least one user.

In Example 54, the subject matter of any one or more of Examples 44-53 optionally include means for displaying a notification that an alteration has been made to the media content item.

In Example 55, the subject matter of any one or more of Examples 44-54 optionally include means for notifying a second user that the media content item presented to the first user has been altered.

In Example 56, the subject matter of any one or more of Examples 44-55 optionally include wherein means for altering the presented media content item to modify the particular portion of the media content item associated with the estimated stress level further comprise: means for identifying a scene associated with the estimate stress level; and means for removing at least a portion of the scene from the media content item.

Example 57 is at least one machine-readable medium including instructions, which when executed by a machine, cause the machine to perform operations of any of the operations of Examples 1-56.

Example 68 is an apparatus comprising means for performing any of the operations of Examples 1-56.

Example 59 is a system to perform the operations of any of the Examples 1-56.

Example 60 is a method to perform the operations of any of the Examples 1-56.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A system for alteration of media content based on stress monitoring, the system comprising:
   a memory including instructions; and
   processing circuitry that, when in operation, is configured by the instructions to implement:
      a presentation module to present a media content item in two distinct content streams, the first content stream presented to a first user at a first content presentation device, and a second content stream presented to a second user at a second content presentation device;
      an accessing module to use sensor generated data to obtain at least one user response indicator for the first user and at least one user response indicator for the second user;
      an estimation module to:
         estimate a stress level for the first user based on the at least one measured user response indicator for the first user; and
         estimate a stress level for the second user based on the at least one measured user response indicator for the second user;
      a stress measurement module to:
         determine whether the estimated stress level for the first user exceeds a first predetermined stress threshold; and
         determine whether the estimated stress level for the second user exceeds a second predetermined stress threshold; and
      a content alteration module to, in accordance with a determination that the estimated stress level for the first user exceeds the first predetermined stress threshold and the estimated stress level for the second user does not exceed the second predetermined threshold:
         associate the estimated stress level for the first user with a particular portion of the media content item; and
         alter the first stream of the presented media content item to modify the particular portion of the media content item associated with the estimated stress level for the first user without altering the second stream of the presented media content, wherein the first stream is altered such that it remains in sync with the second stream once the particular portion of the media content item has been presented.

2. The system of claim 1, wherein the sensor is one of a microphone, a camera, and a heartrate monitor.

3. The system of claim 1, wherein the at least one measured user response indicator for the first user includes at least one of physical movement, heart rate, audio responses, skin temperature, or galvanic skin response.

4. The system of claim 1, wherein the content alteration module further uses the processing circuitry to:
   access eye tracking data for the first user;
   based on the accessed eye tracking data for the first user, identify a particular displayed object associated with the estimated stress level; and
   blur the particular displayed object in the first content stream.

5. The system of claim 4, wherein the content alteration module further uses the processing circuitry to:
   identify a scene associated with the stress level for the first user; and
   remove at least a portion of the scene from the first content stream.

6. The system of claim 5, wherein the instructions configure the processing circuitry to implement:
   a selection module to select replacement content, wherein the duration of the replacement content is the approximately the same as the removed portion of the scene from the media content item; and
   a presentation module to present the replacement content.

7. The system of claim 1, wherein the sensor is a camera and the accessing module further uses the processing circuitry to:
   detect user motion of the first user based on received camera data; and
   compare detected user motion of the first user with reference motion data to identify the user motion.

8. The system of claim 7, wherein the estimation module further uses the processing circuitry to determine a stress level associated with the identified user motion.

9. The system of claim 1, wherein the stress measurement engine further uses the processing circuitry to:
   access a user profile for the first user; and
   based on user information in the user profile, identify a threshold stress level for the user, wherein the user information includes past user reactions to stressful content.

10. The system of claim 1, wherein the instructions configure the processing circuitry to implement:
    a content analysis module to, prior to presenting the media content item:
    receive identification of at least one user to whom the media content item will be presented;
    retrieve media content item description data describing the content of the media content item; and
    identify, based on information stored in a user profile associated with the at least one user to whom the media content item will be presented, one or more portions of the media content item that will exceed the stress threshold of the at least one user.

11. The system of claim 1, wherein the instructions configure the processing circuitry to implement:
    a display module to display a notification that an alteration has been made to the media content item.

12. The system of claim 1, wherein the instructions configure the processing circuitry to implement:
    a notification module to notify the second user that the media content item presented to the first user has been altered.

13. A method for alteration of media content based on stress monitoring, the method comprising:
    presenting a media item in two distinct streams, the first stream presented to a first user on a first content presentation device, and a second stream presented to a second user on a second content presentation device;
    using sensor generated data to estimate a stress level for the first user and the second user;
    determining whether the estimated stress level for the first user exceeds a first predetermined stress threshold and whether the estimated stress level for the second user exceeds a second predetermined stress threshold; and
    in accordance with a determination that the estimated stress level for the first user exceeds the first predetermined stress threshold and the estimated stress level for the second user does not exceed the second predetermined threshold:
    altering the first stream of the media item to modify a particular portion of the media item associated with the estimated stress level for the first user without altering the second stream of the media item, wherein the first stream is altered such that it remains in sync with the second stream once the particular portion of the media content item has been presented.

14. The method of claim 13, wherein determining whether the estimated stress level for the first user exceeds the first predetermined stress threshold comprises:
    accessing a user profile for the first user; and
    based on user information in the user profile, identifying a threshold stress level for the first user.

15. The method of claim 14, wherein the user information includes demographic information for the first user.

16. The method of claim 14, wherein the user information includes past user reactions to stressful content.

17. The method of claim 13, comprising:
    displaying a notification that an alteration has been made to the media content item.

18. The method of claim 13, comprising:
    notifying the second user that the media content item presented to the first user has been altered.

19. At least one non-transitory computer-readable storage medium storing instructions that, when executed by the one or more processors of a machine, cause the machine to:
    present a media content item in two distinct content streams, the first content stream presented to a first user on a first content presentation device, and a second content stream presented to a second user on a second content presentation device;
    use sensor generated data to obtain a first user response indicator for the first user and a second user response indicator for the second user;
    estimate a stress level for the first user based on the first user response indicator;
    estimate a stress level for the second user based on the second user response indicator;
    determine whether the estimated stress level for the first user exceeds a first predetermined stress threshold;
    determine whether the estimated stress level for the second user exceeds a second predetermined stress threshold;
    in accordance with a determination that the estimated stress level for the first user exceeds a first predetermined stress threshold and the estimated stress level for the second user does not exceed a second predetermined threshold:
    associate the estimated stress level for the first user with a particular portion of the media content item; and
    alter the first stream of the presented media content item to modify the particular portion of the media content item associated with the estimated stress level for the first user without altering the second stream of the presented media, wherein the first stream is altered such that it remains in sync with the second stream once the particular portion of the media content item has been presented.

20. The at least one non-transitory computer-readable storage medium of claim 19, further comprising instructions that cause the machine to:
    display a notification that an alteration has been made to the media content item.

* * * * *